United States Patent
Lu et al.

(10) Patent No.: US 7,861,015 B2
(45) Date of Patent: Dec. 28, 2010

(54) USB APPARATUS AND CONTROL METHOD THEREIN

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 144 days.

(21) Appl. No.: 11/796,724

(22) Filed: Apr. 27, 2007

(65) Prior Publication Data

US 2007/0288689 A1    Dec. 13, 2007

(30) Foreign Application Priority Data

Apr. 29, 2006    (CN)    .................... 2006 1 0079102

(51) Int. Cl.
   *G06F 3/00* (2006.01)
(52) U.S. Cl. ............... 710/36; 710/5; 710/7; 710/8; 710/11; 710/20; 710/29; 710/33; 711/2; 711/100; 711/163; 711/164; 711/165
(58) Field of Classification Search .................. 710/5, 710/7, 8, 11, 20, 29, 33, 36; 711/2, 100, 711/163, 164, 165
   See application file for complete search history.

(56) References Cited

U.S. PATENT DOCUMENTS

| | | | | |
|---|---|---|---|---|
| 6,505,773 | B1 * | 1/2003 | Palmer et al. ............... 235/380 |
| 6,763,399 | B2 * | 7/2004 | Margalit et al. ............... 710/13 |
| 7,391,865 | B2 * | 6/2008 | Orsini et al. ................. 380/201 |
| 7,743,409 | B2 * | 6/2010 | Gonzalez et al. ............... 726/9 |
| 7,762,470 | B2 * | 7/2010 | Finn et al. .................... 235/492 |
| 2004/0177258 | A1 * | 9/2004 | Ong ........................... 713/192 |
| 2004/0211835 | A1 * | 10/2004 | Tournemille et al. ........ 235/441 |
| 2005/0262361 | A1 * | 11/2005 | Thibadeau .................. 713/193 |
| 2007/0083939 | A1 * | 4/2007 | Fruhauf et al. ................ 726/34 |
| 2008/0014867 | A1 * | 1/2008 | Finn .......................... 455/41.1 |

FOREIGN PATENT DOCUMENTS

| | | |
|---|---|---|
| CN | 2524296 Y | 12/2002 |
| CN | 1464676   | 12/2003 |
| CN | 2627564 Y | 7/2004 |

* cited by examiner

*Primary Examiner*—Tariq Hafiz
*Assistant Examiner*—Jasjit S Vidwan
(74) *Attorney, Agent, or Firm*—Harness, Dickey & Pierce, P.L.C.

(57) ABSTRACT

The present invention relates to an application of the Universal Serial Bus (USB) technology, and more particularly, to a USB apparatus with data storage and security token and control method therein. In an embodiment of the present invention, both mass storage and security token are implemented in a USB apparatus with a single controller. Thus, the host needs to enumerate the apparatus only once, and then may operate differentially in response to different commands. The mass storage is capable of swapping a mass of data, and has a file allocation table compatible with the system. The security token can be used for authenticating a person through digital certificates or biometric characteristics, maintaining the security of the computer and network applications.

14 Claims, 2 Drawing Sheets

USB APPARATUS AND CONTROL METHOD THEREIN

This application claims the priority of the Chinese patent application No. 200610079102.2, entitled "USB APPARATUS WITH DATA STORAGE AND SECURITY TOKEN AND CONTROL METHOD", the whole contents of which is incorporated herein by reference.

FIELD OF THE INVENTION

The present invention relates to an application of the Universal Serial Bus (USB) technology, and more particularly, to a USB apparatus and control method therein.

BACKGROUND OF THE INVENTION

In recent years, more business activities, such as online shopping or online banking, are carried out on the network as the Internet and ebusiness technologies advance. Therefore, more information associated with personal privacy or business secrets is transmitted over the network. However, online transaction security is compromised by some malicious threats like Trojan horses and phishing fraud. As a result, how to identify a person and prevent identity theft on the network is increasingly concerned by those who are involved in network transactions.

Authentication with a security token apparatus is introduced to provide a low-cost, secure and easy to use solution to the above problem. It employs a strong two-factor mode combining the software and the hardware and using one time password technique for secure authentication in identity verification, providing an ideal means which takes into consideration both usability and security. The security token apparatus can be used to generate cryptographic keys, store digital certificates, and set user privileges etc., and assure that the user's private key always runs within its boundary.

With the development of security technologies, storage technologies are also progressing rapidly. For example, the portable mass storage device is compact and easy to use. Its storage medium may be flash memory, micro drive, Magnetic Random Access Memory (MRAM), Ferroelectric Random Access Memory (FRAM) or Static Random Access Memory (SRAM). This device has a static performance and a scalable capability.

SUMMARY OF THE INVENTION

The embodiments of the present invention provide a Universal Serial Bus (USB) apparatus which has both of data storage and security token, and a control method therein.

In one aspect of the present invention, there is provided a Universal Serial Bus (USB) apparatus which has both of data storage and security token, the USB apparatus comprises: a Universal Serial Bus communication module for resolving data transfer protocol; a mass storage module for storing a mass of data; a program storage module; a security token data storage module, and one controller module for controlling the Universal Serial Bus communication module, the mass storage module, the program storage module and the security token data storage module and processing data; the USB communication module, the mass storage module, the program storage module and the security token data storage module being coupled to the controller module respectively.

The storage medium of the mass storage module may be a flash memory, a micro drive, a Magnetic Random Access Memory (MRAM), a Ferroelectric Random Access Memory (FRAM) or a Static Random Access Memory (SRAM).

The controller module and the program storage module may be located in one chip.

The USB communication module may be located in a separate USB protocol conversion chip, or in one chip with the controller module.

The mass storage module may be located in a separate storage chip, or in one chip with the controller module.

The security token data storage module may be located in one chip with the controller module, or may be integrated in a storage chip with the mass storage module when the mass storage module is located in a separate storage chip.

In another aspect of the present invention, there is provided a control method for a USB apparatus with data storage and security token, which comprises the steps of: initializing the USB apparatus, and establishing communication with a host in response to a USB request from the host; receiving USB data, and performing a protocol conversion and analysis to the USB data; determining whether a command resulted from the analysis is an operation for mass storage or an operation for security token; conducting a storage processing if the command is for mass storage, or conducting a cryptographic key processing if the command is for security token; and returning a result of the processing.

The operation for mass storage may include, but not limited to, communicating a file allocation table to the host and processing a data file.

Processing a data file involves encrypting data to be written and/or decrypting data to be read.

The operation for security token may include, but not limited to, at least one of processing data and organizing the processed data, processing data involves encrypting data, decrypting data, storing and verifying a password, storing and verifying a signature, storing and verifying a certificate or managing privileges.

In an embodiment of the present invention, both mass storage and security token are implemented in a USB apparatus with a single controller. Thus, the host needs to enumerate the apparatus only once, and then the host may operate differentially in response to different commands. The mass storage is capable of swapping a mass of data, and has a file allocation table compatible with the system. The security token can be used for authenticating a person through digital certificates or biometric characteristics, maintaining the security of computer and network applications.

BRIEF DESCRIPTION OF THE DRAWINGS

The embodiments of the present invention may be further understood from the following description in conjunction with the appended drawings. In the drawings.

DETAILED DESCRIPTION OF THE PREFERRED EMBODIMENTS

The embodiments of the present invention will be described below with reference to the appending drawings.

It is very feasible to provide an apparatus with both authentication and high storage capabilities. This is a main object of the present invention.

A mass storage device may be a storage device with a USB interface. It employs a microprocessor with I/O interface to extend a high capability data memory. The data memory may be a flash memory, a micro drive, a Magnetic Random Access Memory (MRAM), a Ferroelectric Random Access Memory (FRAM), a Static Random Access Memory (SRAM) or the like. The memory is a non-volatile memory. It is possible that various external circuitries, including power supply circuitry, clock circuitry, storage interface circuitry and USB communication circuitry, are involved in the design depending on the chip being used.

Generally, the security token also employs a USB interface for interfacing with a computer. It comprises a microprocessor and a memory for storing authentication information, such as certificates and passwords. The memory is a non-volatile memory. It may be a flash memory, a micro drive, a MRAM, a FRAM, a SRAM or the like.

It is apparent that the above mentioned two devices both have a USB interface, a microprocessor, a non-volatile memory, wherein the differences lie in the USB communication protocols they employ, the programs running inside the microprocessors, and some external circuitries required for the systems to function. The difference in hardware is caused by different microprocessors with different external circuitries. If a microprocessor that can satisfy the processing requirements of both the mass storage device and the security token is applied, and interaction with the host is completed with a unified communication protocol, and the resolution of the protocol is achieved inside the microprocessor in order to determine whether the current working state is for the mass storage device or for the security so that a corresponding program may be run, the combination of these two devices in a single apparatus could be realized.

The details of the embodiments of the present invention are provided through the description as follows.

Figure 1:
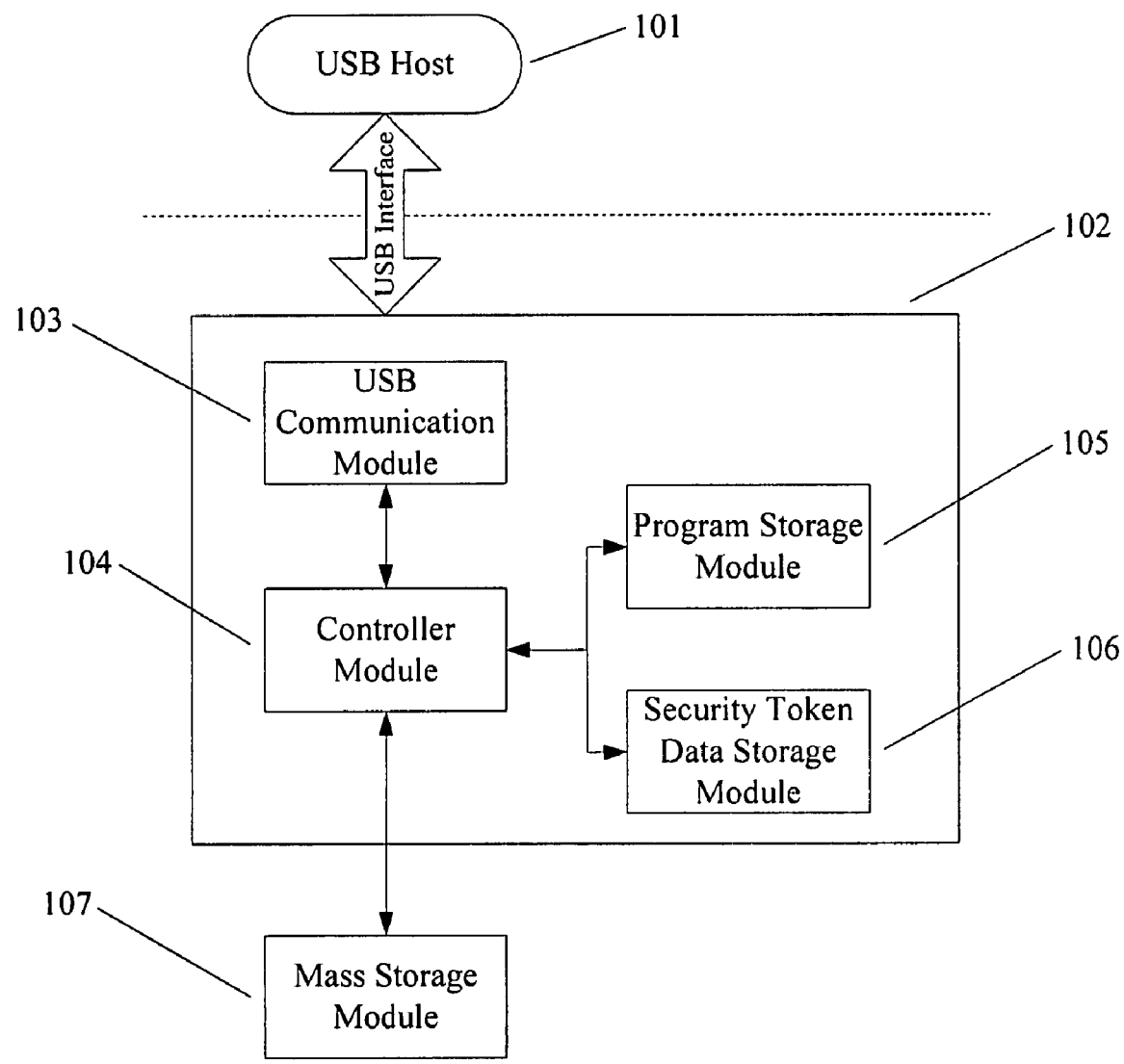
FIG. 1 is a schematic of the components and interconnections therebetween of an apparatus according to an embodiment of the present invention.

Referring to FIG. 1, a USB communication module 103, a program storage module 105 for storing the firmware programs and other programs required by the apparatus in operation and a security token data storage module 106 for storing data relating to security features, such as keys and digital certificates, are coupled to a controller module 104 respectively, and are located in a chip 102. The chip 102 may be, but is not limited to, a smart card chip. The USB communication module 103 is adapted to interface with a host 101, receive and send USB interface data, transfer a status signal, a data signal and a control signal and/or translate the signals to run corresponding programs. A mass storage module 107 is also coupled to the controller module 104 and may be located in a separate storage chip.

The above embodiment is merely an example and should not be considered as any limit to the present invention. In other embodiments, the USB communication module 103 may be located in a separate USB protocol conversion chip; and/or the mass storage module 107 may be also located in the smart card chip 102; and/or the security token data storage module 106 may also be located in a separate storage chip with the mass storage module 107.

In another embodiment of the present invention, there is provided a control method for the above apparatus.

Figure 2:
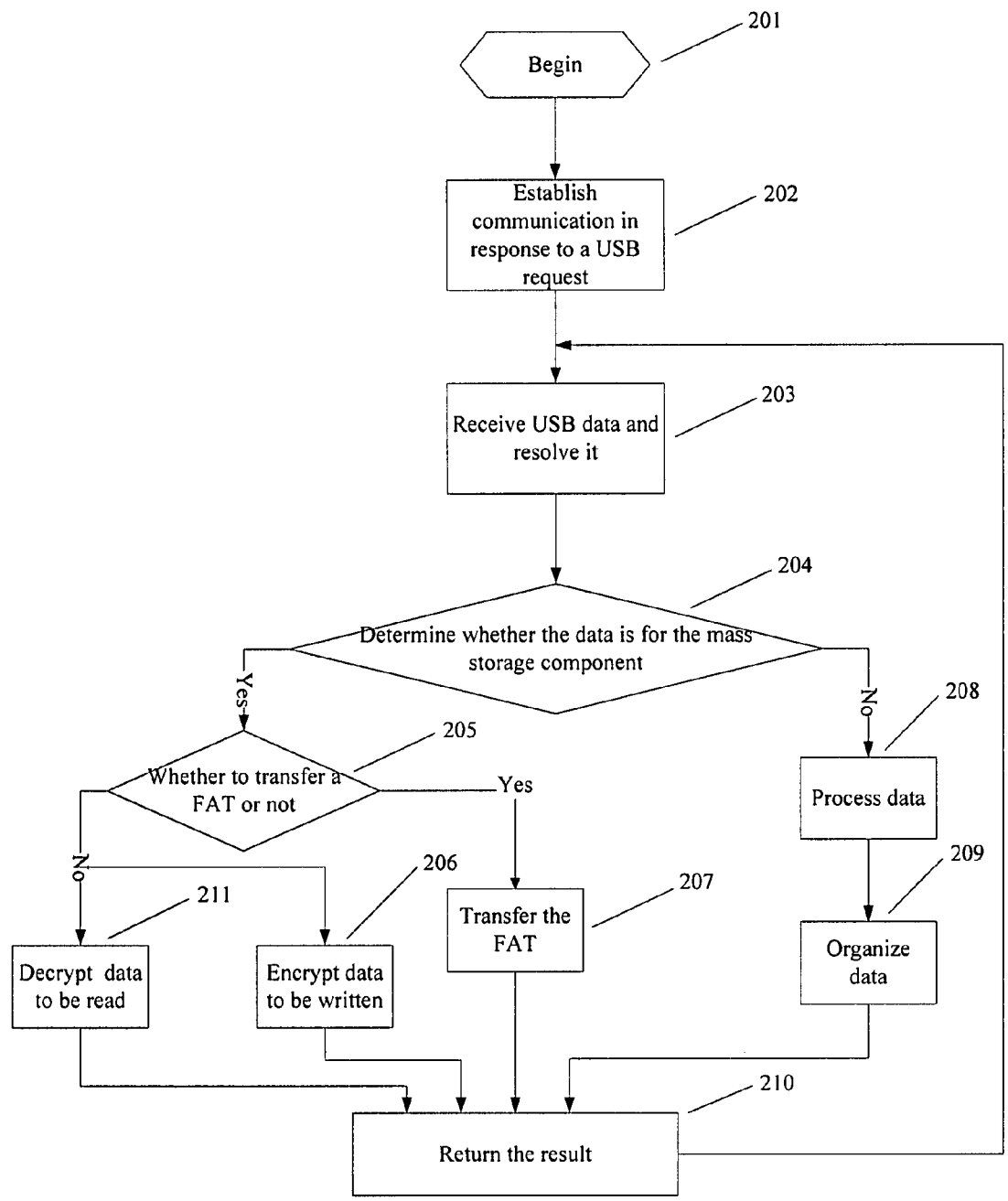
FIG. 2 is a schematic of the flow of a control method according to an embodiment of the present invention.

Referring to FIG. 2, after being coupled to the host in step 201, the USB apparatus begins to initialize in response to a USB request from the host, and to establish communication with the host in step 202. The USB apparatus receives a request from the host and analyzes the data in step 203, and then determines the operating state of the system through the analyzed data in step 204. If the determined operating state indicates that the operation is for the mass storage component of the apparatus, the apparatus would further process the data to determine whether it should transmit a File Allocation Table (FAT) to the host or not in step 205. If yes, it would transmit a file allocation table to the host in step 207. If the file allocation table is transmitted, the apparatus could perform a data file interaction, including receiving data from the host and transmitting the internal data of the mass storage component to the host, with the host normally. To maintain the data security, the data stored in the mass storage component may be in an encrypted form. Therefore, the data to be written into the component may be encrypted in step 206, and the data to be read from the component may be decrypted in step 211. Finally, the apparatus returns the processing result to the host in step 210. If the determined operating state indicates that that the operation is for its security token component, the apparatus begins to process the data, including receiving and sending data, encrypting/decrypting data, verifying a password or signature, storing a password or certificate and/or setting privileges and so on, in step 208. If a biometric characteristic identifying module is also integrated into the host or the USB apparatus, the processing should also involve the storage and verification of biometric characteristics. Then the apparatus organizes the processing result in step 209 and returns it to the host in step 210.

In an embodiment of the present invention, both the mass storage and the security token are implemented in a single apparatus. The mass storage component is capable of the swapping of a mass of data, and may be repeatedly erasable. The mass storage component has a file allocation table that is compatible with the system. The security token component can be used to authenticate a person through digital certificates or biometric characteristics or both, so as to ensure the security of the applications on a computer or network. In addition, the apparatus is portable.

Because the authentication of the security token component is an application of high-level security, the program storage module and the security token data storage module are optimally located in one chip with the controller, that is, the critical data may be saved inside the microprocessor to avoid being copied in a unauthorized way. In addition, the security of the general-purpose data and especially the security token data stored in the mass storage component is maintained, as the data inside the mass storage component is in the form of encrypted text. Moreover, integrating the storage function and the security token control function in one chip facilitates the cryptographic process to be done before the storage process. As a result, the read and/or write access to the data is privilege protected. In other words, an entity trying to gain access to the data in the mass storage component must be authenticated with the security token component. Thereby, the data security of the mass storage component is increased. The privacy is protected against viruses and hackers by transmitting encrypted data from the mass storage component to the host.

It will be appreciated by those of ordinary skill in the art that the invention can be embodied in other specific forms without departing from the spirit thereof. The presently disclosed embodiments should therefore be considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A Universal Serial Bus (USB) apparatus, comprising:
a Universal Serial Bus communication module for resolving data transfer protocol;

a mass storage module for storing a mass of data;

a program storage module;

a security token data storage module; and one controller module that controls the Universal Serial Bus communication module, the mass storage module, the program storage module and the security token data storage module and that processes the data, wherein the Universal Serial Bus communication module, the mass storage module, the program storage module and the security token data storage module each are coupled to the controller module, wherein the Universal Serial Bus communication module is adapted to transfer, with a unified communication protocol, data between the controller module and a host, the controller module running as a master of the mass storage module and the security token data storage module, and wherein the one controller module is adapted to determine, after receiving the data transferred from the Universal Serial Bus communication module, whether an operation for the data is for the mass storage module or for the security token data storage module, and when the operation is for the mass storage module, the one controller module controls the security token data storage module to encrypt the data before the data is stored in the mass storage module and to decrypt the encrypted data before transferring the decrypted data to the host when the host is to read the encrypted data from the mass storage module;

and when the operation is for the security token data storage module, the one controller module is adapted to control the security token data storage module to authenticate identity of a user of a network or a user of the host through at least one of digital certificate and digital signature as well as perform security data processing operations, wherein the security data processing operations involve at least one of receiving and sending data, encrypting data, decrypting data, storing and verifying a password, storing and verifying a signature, storing and verifying a certificate or managing privileges.

2. The Universal Serial Bus apparatus of claim 1, wherein a storage medium of the mass storage module is a flash memory, a micro drive, a Magnetic Random Access Memory (MRAM), a Ferroelectric Random Access Memory (FRAM) or a Static Random Access Memory (SRAM).

3. The Universal Serial Bus apparatus of claim 1, wherein the controller module and the program storage module are located in one chip.

4. The Universal Serial Bus apparatus of claim 2, wherein the controller module and the program storage module are located in one chip.

5. The Universal Serial Bus apparatus of claim 3, wherein the Universal Serial Bus communication module is located in a separate Universal Serial Bus protocol conversion chip or in one chip with the controller module.

6. The Universal Serial Bus apparatus of claim 4, wherein the Universal Serial Bus communication module is located in a separate Universal Serial Bus protocol conversion chip or in one chip with the controller module.

7. The Universal Serial Bus apparatus of claim 3, wherein the mass storage module is located in a separate storage chip or in one chip with the controller module.

8. The Universal Serial Bus apparatus of claim 4, wherein the mass storage module is located in a separate storage chip or in one chip with the controller module.

9. The Universal Serial Bus apparatus of claim 3, wherein the security token data storage module is located in one chip with the controller module, or in a same storage chip with the mass storage module which is located in a separate storage chip.

10. The Universal Serial Bus apparatus of claim 4, wherein the security token data storage module is located in one chip with the controller module, or in a same storage chip with the mass storage module which is located in a separate storage chip.

11. A control method for a Universal Serial Bus apparatus, the method comprising the steps of:

initializing a Universal Serial Bus apparatus, establishing communication with a host in response to a Universal Serial Bus request sent from the host, wherein the Universal Serial Bus apparatus includes a Universal Serial Bus communication module, a mass storage module, a program storage module, a security token data storage module, and one controller module;

receiving by the Universal Serial Bus communication module Universal Serial Bus data, performing, by the Universal Serial Bus communication module, a protocol conversion and analysis, with a unified communication protocol, of the Universal Serial Bus data between the controller module and the host, the controller module running as a master of the mass storage module and the security token data storage module;

determining, by the one controller module, whether a command resulted from the analysis is an operation for mass storage or an operation for security token;

if the command is for an operation for mass storage, conducting a storage process including controlling, by the controller module, the security token data storage module to encrypt the data and store the encrypted data into the mass storage module, and to decrypt the encrypted data stored in the mass storage module when the host is to read the encrypted data from the mass storage module, or if the command is for security token, conducting a cryptographic key processing including controlling by the controller module the security token data storage module to authenticate identity of a user of a network or a user of the host through at least one of digital certificate and digital signature as well as perform security data processing operations, wherein the security data processing operations involve at least one of receiving and sending data, encrypting data, decrypting data, storing and verifying a password, storing and verifying a signature, storing and verifying a certificate or managing privileges; and returning a result of the storage process or cryptographic processing.

12. The control method of claim 11, wherein the operation for mass storage includes communicating a file allocation table to the host and processing a data file.

13. The control method of claim 12, wherein processing a data file involves encrypting data to be written and/or decrypting data to be read.

14. The Universal Serial Bus apparatus of claim 1, wherein the Universal Serial Bus (USB) apparatus is a portable device.

* * * * *